US 8,001,581 B2
Aug. 16, 2011

(12) United States Patent
Ford et al.

(10) Patent No.: US 8,001,581 B2
(45) Date of Patent: Aug. 16, 2011

(54) METHODS AND SYSTEMS FOR EMBEDDED USER AUTHENTICATION AND/OR PROVIDING COMPUTING SERVICES USING AN INFORMATION HANDLING SYSTEM CONFIGURED AS A FLEXIBLE COMPUTING NODE

(75) Inventors: Jeremy Ford, Spring, TX (US); Yuan-Chang Lo, Austin, TX (US); Clint O'Connor, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 491 days.

(21) Appl. No.: 12/316,940

(22) Filed: Dec. 17, 2008

(65) Prior Publication Data
US 2010/0153697 A1    Jun. 17, 2010

(51) Int. Cl.
G06F 17/30    (2006.01)
(52) U.S. Cl. .................................. 726/2; 713/1; 713/2
(58) Field of Classification Search ........................ None
See application file for complete search history.

(56) References Cited

U.S. PATENT DOCUMENTS

| | | | | |
|---|---|---|---|---|
| 6,516,350 | B1 * | 2/2003 | Lumelsky et al. | 709/226 |
| 6,609,151 | B1 * | 8/2003 | Khanna et al. | 709/222 |
| 7,299,354 | B2 * | 11/2007 | Khanna et al. | 713/165 |
| 2001/0052069 | A1 * | 12/2001 | Sekiguchi | 713/2 |
| 2004/0268140 | A1 * | 12/2004 | Zimmer et al. | 713/200 |
| 2005/0010811 | A1 * | 1/2005 | Zimmer et al. | 713/201 |
| 2006/0041581 | A1 * | 2/2006 | Aghvami et al. | 707/102 |
| 2007/0186091 | A1 | 8/2007 | Yang et al. | |
| 2008/0114976 | A1 | 5/2008 | Dandekar et al. | |
| 2010/0058325 | A1 * | 3/2010 | Macken et al. | 717/174 |

OTHER PUBLICATIONS

Sailer et al., "sHype: Secure Hypervisor Approach to Trustted Virtualized Systems", IBM Research Report, RC23511, Feb. 2005.*
Majenta Solutions, "VMware Virtual Desktop Infrastructure", Printed from Internet Jul. 26, 2008, 3 pgs.
VMware, "VMware Professional Services Virtual Desktop Manager", 2007, 2 pgs.
Majenta Solutions, "VMware Virtual Center", Printed from Internet Jul. 26, 2008, 2 pgs.
Dell, "Dell™ MediaDirect™ Frequency Asked Questions", Technical Support, Printed from Internet Jul. 26, 2008, 5 pgs.
Cherian et al, "System and Method for OS Boot Image Provisioning Based on User Identity to Enable Mobile Users", filed Dec. 20, 2007, U.S. Appl. No. 11/961,048, 17 pgs.
Phoenix Technologies, Virtualization, "Phoenix Technologies Confirms HyperCore Existence", Printed from Internet Aug. 12, 2008, 5 pgs.
Phoenix Technologies, "Transforming the Personal Computing Experience", Printed from Internet Aug. 12, 2008, 2 pgs.
Phoenix Technologies, "Phoenix HyperSpace—Laying the Foundation for PC 3.0 with Embedded Simplicity", Printed from Internet Aug. 12, 2008, 3 pgs.

(Continued)

Primary Examiner — Peter Poltorak
(74) Attorney, Agent, or Firm — O'Keefe, Egan, Peterman & Enders LLP

(57) ABSTRACT

Methods and systems for providing embedded user authentication and/or providing computing services using an information handling system configured as flexible computing node, and which may be implemented to perform preboot authentication of users. The flexible computing node may also be configured to provision the appropriate work environment for a given user based on one or more user parameters (e.g. entitlements, location, network connection, and/or other parameters).

25 Claims, 3 Drawing Sheets

OTHER PUBLICATIONS

BrianMadden, RemoteScan, "Scanners With Terminal Server and Citrix", Printed from Internet Aug. 12, 2008, 16 pgs.

IBM, "Leostream Connection Broker", Printed from Internet, 5 pgs.

IBM, "Virtual Client Solution From IBM", Printed from Internet Aug. 12, 2008, 2 pgs.

IBM, "Leostream Connection Broker", Printed from Internet Aug. 12, 2008, 3 pgs.

Dell, Power Solutions, "How Streaming the OS and Applications Changes the Rules for Server Provisioning", Aug. 2007, 3 pgs.

Cox, "Citrix Acquires Ardence for Pc, Server Provisioning", Networkworld, Dec. 20, 2006, 3 pgs.

* cited by examiner

METHODS AND SYSTEMS FOR EMBEDDED USER AUTHENTICATION AND/OR PROVIDING COMPUTING SERVICES USING AN INFORMATION HANDLING SYSTEM CONFIGURED AS A FLEXIBLE COMPUTING NODE

FIELD OF THE INVENTION

This invention relates generally to information handling systems, and more particularly to user authentication and/or provision of computing services using an information handling system configured as flexible computing node.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Personal computers and thin clients fixed in function based on which operating system with which they are provisioned with on the local storage media. In a computing environment where a device can be used to take on multiple roles, booting an operating system that is resource intensive takes a relatively long period of time and presents potential security exposures.

SUMMARY OF THE INVENTION

Disclosed herein are methods and systems for providing embedded user authentication and services on an information handling system configured as flexible computing node. The disclosed methods and systems may be implemented in one embodiment using a flexible computing client that performs preboot authentication of users. The flexible computing client may also be configured in one embodiment to provision the appropriate work environment for a given user based on one or more user parameters (e.g., entitlements, location, network connection, and/or other parameters).

In one exemplary embodiment, a flexible computing client may be running as an application on a service operating system (OS), or alternatively may be implemented as part of platform firmware, e.g., Unified Extensible Firmware Interface (UEFI). A flexible computing client may also be stored on platform non-volatile memory (e.g., flash memory) in one embodiment in order to support not only traditional personal computer clients, but other types of clients, such as diskless clients, remote desktop clients, Keyboard, Video and Monitor over IP (KVMoIP) clients, etc. In one exemplary embodiment, a flexible computing client may be embedded as code in non-volatile memory, such as non-volatile random access memory (NVRAM), and implemented to provide an instant on user experience, even when started from a power-off state. In this regard, the disclosed methods and systems may be implemented in one embodiment using a relatively small code size that facilitates storage on such non-volatile memory.

In a further exemplary embodiment, the integrity of a flexible client may be checked via a secure boot mechanism using a trusted computing module (TPM) and processor memory protection mechanism to ensure high degree of trustworthiness. For example, before each component of the operating system is loaded and executed, its digital signature may be compared with a digital signature stored in the TPM to ensure the software has not been tampered with by ensuring that the digital signatures match each other. An extra layer of security may be provided by setting the platform non-volatile memory to be read-only for normal operations, e.g., so that malware cannot modify the software stored in it.

In yet another embodiment, a flexible computing client may be run in a virtual machine on a hypervisor (virtual machine monitor). In such an implementation, a flexible computing client may continue to monitor the user session after the main operating system boots and/or a user connects to a remote session (e.g., via Microsoft remote desktop protocol (RDP), Cytrix independent computing architecture (ICA) protocol, KVMoIP protocol, etc.), and may take out of band administrative actions if needed. For example, a new user may be re-authenticated by the flexible computing client without having to reboot the user operating system (i.e., assuming the new user is entitled to use the same operating system image). In this regard, a new user may be allowed to access a remote computer in a RDP or other virtual desktop session while at the same time maintaining the local operating system session (e.g., Windows session) and maintaining complete separation between the local operating system session and remote session for situations where isolation is required or otherwise desired.

A flexible computing client may be configured in one embodiment to accept multiple forms of user identification information (ID) and/or user authentication credential inputs (e.g., user identification (ID) and password, smart card, biometric information, security token, etc.), and to present either the accepted user authentication credential inputs (or alternatively to present user authentication credentials determined based on the accepted user identification (ID) information) to the authentication server. If authentication is successful, the flexible computing client may be configured to retrieve the authorized computing resource (e.g., Active Directory, connection broker configuration database, etc.) for the user, and then either connect to the resource or provide choices to the user (e.g., list of operating system images for diskless boot or list of remote access sessions). A flexible computing client may also be configured to authenticate a client platform device prior to booting the operating system, e.g., so that the flexible computing device may negotiate access to an 802.1X based layer 2 switch to gain access to a corporate wired network infrastructure with network access control where the user authentication server and the boot server usually reside. 802.1X technology may also be employed as the flexible computing device authentication mechanism for the enterprise wireless network.

Using the disclosed methods and systems a flexible computing client may be provided in another embodiment that allows tailored usage of a client platform device based on number of possible variables. Examples of such variables include, but are not limited to: 1. Policy: enterprise policy set in directory service, which is enforced with authorization phase after the client platform device and/or the user have been authenticated; 2. User: based on the user log-in credential/s, a list of available computing options may be compiled; and 3. Location and/or connection: based on the location of the client platform device and/or the network connection characteristics (e.g., bandwidth, latency, jitter, etc.), a prioritized list of network connection options may be presented to the user. Based on these variables, a flexible computing client may be configured in one embodiment to enable a client platform device to operate in any of the following exemplary configurations, while retaining a degree of service and authentication control:

1. OS running on a local hard disk drive on a physical machine
2. OS running on local hard disk drive on a virtual machine
3. OS streaming from a boot server on a physical machine
4. OS streaming from a boot server on a virtual machine
5. RDP or other virtual desktop protocol to Virtual Remote Desktop
6. RDP or other virtual desktop protocol to Terminal Service
7. KVMoIP to Dedicated Remote PC
8. Browser connection to web applications
9. Local admin configuration utility Examples of exemplary features that may be implemented in embodiments of the disclosed methods and systems include, but are not limited to, one or more of the following: 1) pre-operating system authentication of user and devices that may be implemented to enhance enterprise security (e.g., only known users may be allowed to access the computing infrastructure using authorized devices and access mechanism); 2) instant on access to a user login screen; 3) connection to operating system and application/s running on a local physical or virtual machine, remote virtual or physical machine, remote terminal service, web applications or combinations of these concurrently with virtualization; 4) connection choice based on user, device, location, and network connection (with policy associated with these attributes).

In one respect, disclosed herein is a method of operating an information handling system, including: providing an information handling system configured as a flexible computing node, the flexible computing node being coupled to a network and including an embedded service operating system (OS), embedded application operating system (OS), a local operating system (OS), and one or more processing devices configured to execute the embedded service operating system (OS), embedded application operating system (OS), and local operating system (OS); and using the one or more processing devices to execute the following steps: booting the embedded service OS on the flexible computing node without booting the local OS or the embedded application OS, then receiving user authentication credentials or user identification information in the embedded service OS from a user, then presenting received user authentication credentials or user authentication credentials determined based on received user identification information from the embedded service OS across the network to an authentication server, then using the embedded service OS to determine whether to boot the embedded application OS or to boot the local OS only upon successful authentication of the presented user authentication credentials by the authentication server of the presented user authentication credentials, and then booting either the embedded application OS or the local OS based on the determination made by the embedded service OS.

In another respect, disclosed herein is an information handling system configured as flexible computing node, including: one or more processing devices; an embedded service operating system (OS); an embedded application operating system (OS); and a local operating system (OS); wherein the flexible computing node is configured to be coupled to a network; and wherein the flexible computing node is configured to use the one or more processing devices to: boot the embedded service OS on the flexible computing node without booting the local OS or the embedded application OS, then receive user authentication credentials or user identification information in the embedded service OS from a user, then present received user authentication credentials or user authentication credentials determined based on received user identification information from the embedded service OS across the network to an authentication server, then use the embedded service OS to determine whether to boot the embedded application OS or to boot the local OS only upon successful authentication of the presented user authentication credentials by the authentication server of the presented user authentication credentials, and then boot either the embedded application OS or the local OS based on the determination made by the embedded service OS.

In another respect, disclosed herein is a method of operating an information handling system, including: providing an information handling system configured as a flexible computing node, the flexible computing node being coupled to a network and including a flexible computing client and further including one or more processing devices; and using the one or more processing devices to execute the following steps: accepting user authorization credentials or user identification information in the flexible computing client from a user, then presenting accepted user authorization credentials or user authentication credentials determined based on accepted user identification information from the flexible computing client across the network to an authentication server, then compiling a list of one or more authorized computing resources for the user in the flexible computing client based at least in part on the user authorization credentials, and presenting the list of the one or more authorized computing resources for the user upon successful user authentication by the authentication server, and then using the flexible computing client to at least one of connect to the authorized computing resources for the user, present choices of two or more authorized computing resources to the user for connection to the authorized computing resources, or a combination thereof.

In another respect, disclosed herein is an information handling system configured as a flexible computing node configured for coupling to a network, the information handling system including: a flexible computing client; and one or more processing devices, the one or more processing devices being configured to execute the flexible computing client to: accept user authorization credentials or user identification information from a user and present accepted user authorization credentials or user authentication credentials determined based on accepted user identification information across the network to an authentication server, compile and present a list of one or more authorized computing resources to the user upon successful user authentication, the list of one or more authorized computing resources being based at least in part on the user authorization credentials of the user, and at least one of connect to the authorized computing resources for the user, present choices of two or more authorized computing resources to the user for connection to the authorized computing resources, or a combination thereof.

DESCRIPTION OF ILLUSTRATIVE EMBODIMENTS

Figure 1:
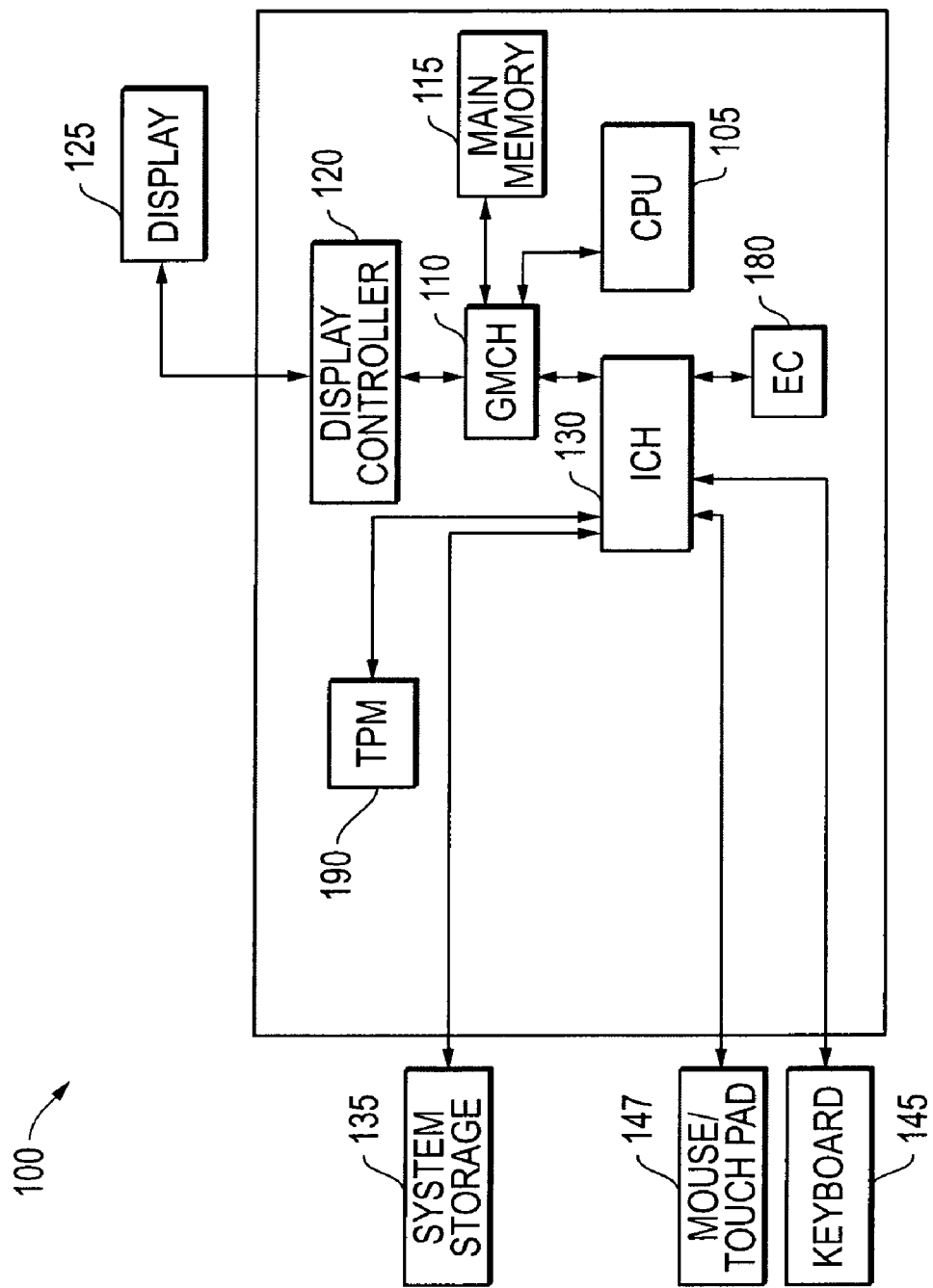
FIG. 1 is a simplified block diagram of an information handling system as it may be configured according to one exemplary embodiment of the disclosed methods and systems.

FIG. 1 is a block diagram of an information handling system 100 as it may be configured for implementation of a flexible computing node according to one exemplary embodiment of the disclosed methods and systems. Information handling system 100 may be, for example, a desktop computer or a portable information handling system such as a notebook computer. As shown in FIG. 1, information handling system 100 of this exemplary embodiment includes a CPU 105 such as an Intel Pentium series processor, an Advanced Micro Devices (AMD) processor or one of many other processors currently available. A graphics/memory controller hub (GMCH) chip 110 is coupled to processor 105 to facilitate memory and display functions. System memory 115 and a display controller 120 may be coupled to GMCH 110. A display 125 (e.g., LCD display or other suitable display device) is coupled to display controller 120 to provide visual images to the user. An I/O controller hub (ICH) chip 130 is coupled to GMCH chip 110 to facilitate input/output functions for the information handling system. Local system storage 135 (e.g., one or media drives such as hard disk drive/s, optical drives, etc.) may be coupled to ICH chip 130 to provide permanent system storage for the information handling system. Input devices such as a keyboard 145 and touchpad 147 may be coupled to ICH chip 130 to enable the user to interact with the information handling system. An embedded controller (EC) 180 running system BIOS and a trusted platform module (TPM) 190 are each also coupled to ICH chip 130. It will be understood that the particular configuration of FIG. 1 is exemplary only, and that an information handling system may be configured with fewer, additional or alternative components than those illustrated in FIG. 1, e.g., including a network interface card (wired and wireless).

Figure 2:
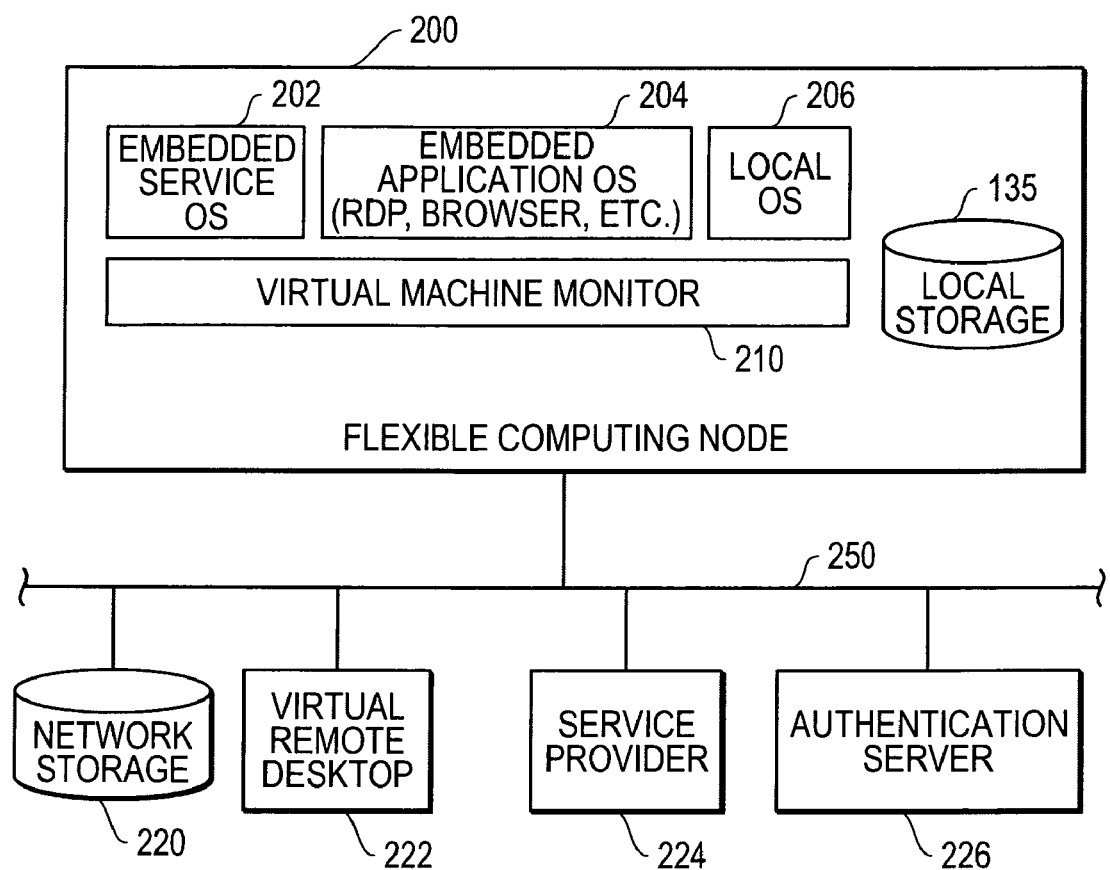
FIG. 2 illustrates a flexible computing node as it may be implemented according to one exemplary embodiment of the disclosed methods and systems

FIG. 2 illustrates a flexible computing node 200 as it may be implemented by an information handling system (e.g., such as information handling system 100 of FIG. 1) and coupled to a network 250 according to one exemplary embodiment of the disclosed methods and systems. As shown in FIG. 1, flexible computing node 200 includes a hypervisor or virtual machine monitor 210 (e.g., implemented as firmware executing on CPU 105) that is configured to allow multiple operating system (OS) types to run concurrently on the same flexible computing node 200. In the exemplary embodiment of FIG. 1, the three operating system types illustrated that may run concurrently on top of virtual machine monitor 210 are embedded service OS 202, embedded application OS 204, and local OS 206. Optional local system storage 135 is also shown present and configured to exchange information (e.g., local OS 206 such as Windows OS, Linux OS) with the other processing components of flexible computing node 200. It will be understood that the configuration of FIG. 2 is exemplary only and that any two or more operating systems may be running concurrently on top of virtual machine monitor 210, e.g., either embedded service OS 202 or embedded application OS 204 running concurrently with local OS 206. Additionally, it is not necessary that all operating systems present on a given flexible computing node be running concurrently at any given time. Furthermore, it will be understood that more than one hard disk drive or any other suitable alternative system storage (e.g., optical drive/s, FLASH memory, etc.) may additionally or alternatively be provided for flexible computing node 200.

Still referring to FIG. 2, local OS 206 may run in one exemplary embodiment on CPU 105 of information handling system 100 and serve as an interface between a user, software applications, and the resources (e.g., hardware such as memory 115, local system storage 135, CPU 105, etc.) of information handling system 100. In one embodiment, embedded service OS 202 and embedded application OS 204 may each be stored on system firmware storage along with system BIOS. Embedded service OS 202 interacts with an authentication server 226 (e.g., across network 250 and is configured to perform initial user log-in authentication tasks in cooperation with authentication server 226. For example, during a given initial user log-in operation, authentication server 226 may instruct embedded OS 202 whether the flexible computing node is to load embedded application OS 204 to perform tasks for the given user as a thin client, or if the flexible computing node is to load and run local OS 206 and access host application/s locally running on local OS 206. Embedded application OS 204 interacts with service provider 224 (e.g., web server, terminal server) or virtual remote desktop 222 (e.g., to implement a thin client session) across network 250 as may be appropriate for a given client session. Network storage 220 is present on network 250 and may be present to provide storage for flexible computing node 200, e.g., for network booting OS when optional local system storage 135 is not present.

Figure 3:
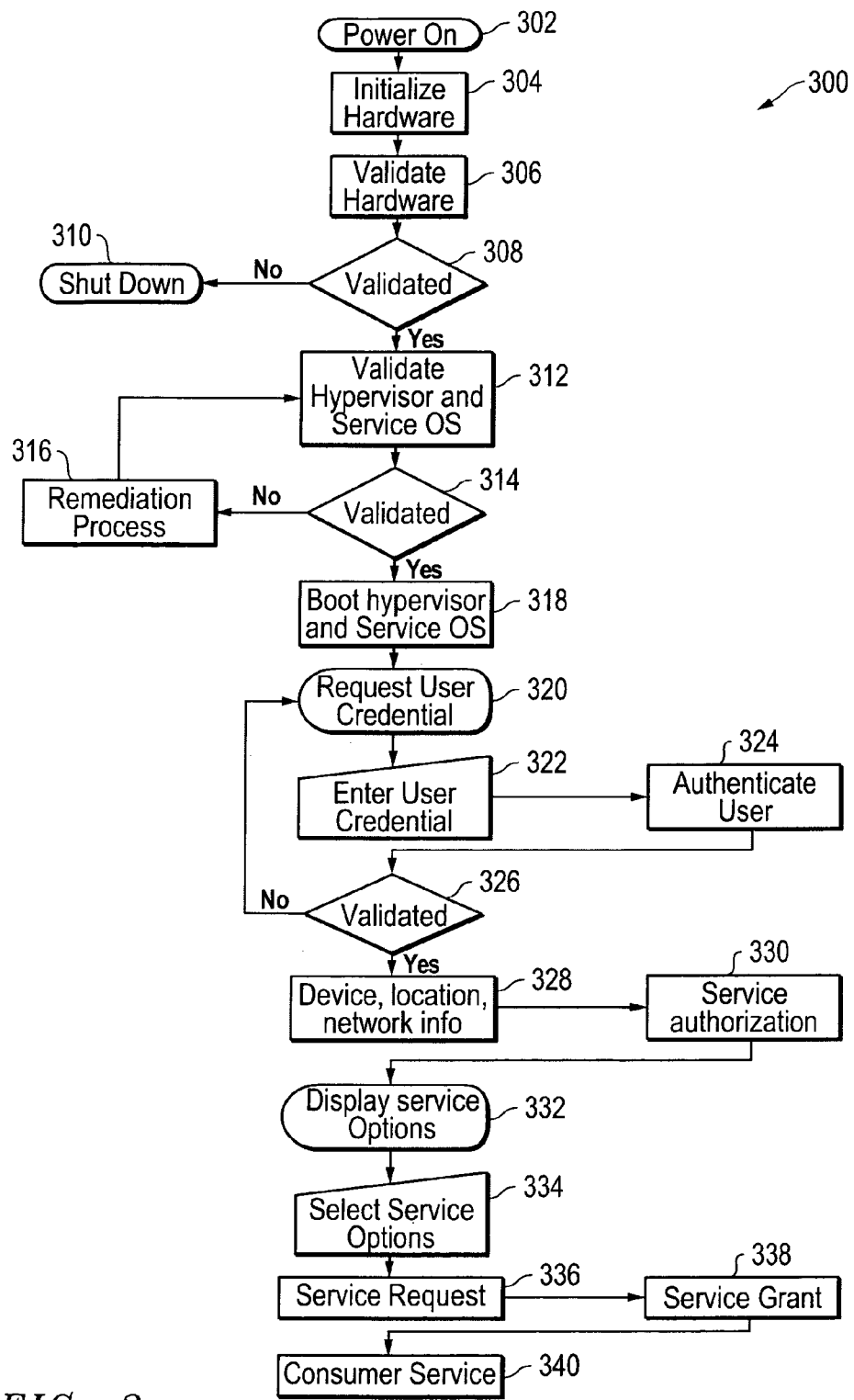
FIG. 3 illustrates methodology as it may be implemented according to one exemplary embodiment of the disclosed methods and systems

FIG. 3 illustrates one exemplary embodiment of methodology 300 that may be implemented using a flexible computing node of the disclosed methods and systems, e.g., a flexible computing node 200 of FIG. 2 that may be implemented by an information handling system client device such as information handling system 100 of FIG. 1. As shown, methodology 300 starts in step 302, where the client device is powered on. Methodology 300 then proceeds to step 304 where hardware of information handling system 100 is initialized, and then to step 306 where the hardware is validated (e.g., by BIOS or extensible firmware interface ("EFI") running on EC 180). If the validation of information handling system hardware is found unsuccessful in step 308, then information handling system 100 shuts down in step 310 and methodology 300 terminates.

However, if the validation of information handling system hardware is found to be successful in step 308, then methodology 300 proceeds to step 312 where virtual machine monitor (hypervisor) 210 and embedded service OS 202 are each validated (e.g., by BIOS or extensible firmware interface ("EFI") running on EC 180). If validation is found successful in step 314 then methodology 300 proceeds next to step 318 where virtual machine monitor (hypervisor) 210 and embedded service OS 202 are each booted up. However, if validation is not found successful in step 314, then a remediation process is performed in step 316 where a new copy of the virtual machine monitor and service OS is programmed in the local firmware storage (e.g. flash memory), after which step 312 is repeated. In one exemplary embodiment, steps 302 to 320 (described further below) may be implemented in an "instant on" manner, without requiring booting of local OS 206 using just the embedded service OS 202 and virtual machine monitor 210 that is implemented on firmware executing on CPU 105.

Still referring to FIG. 3, user authentication credentials are requested in step 320 by the flexible computing node 200 following bootup of virtual machine monitor (hypervisor) 210 and embedded service OS 202. User authentication credentials are then entered by the user in step 322. Such user authentication credentials may include any information suitable for authenticating the identity of a given user including, but not limited to, user ID and password, smart card, biometric information, security token, etc. and combinations thereof. It will also be understood that in an alternative embodiment user identification information (e.g., user ID) alone (i.e., instead of user authentication credentials) may be requested and entered by the user, and the embedded service OS may determine the user authentication credentials based on the input user identification information.

Embedded service OS 202 of flexible computing node 200 interacts with authentication server 226 and presents the entered user authentication information to authentication server 226 (e.g., active directory server) of FIG. 2 across network 250, and the authentication server authenticates the user in step 324. In step 326, embedded service OS 202 of flexible computing node 200 then determines whether the user authentication credentials have been validated in step 326 by authentication server 226. If validation fails in step 326, then step 320 repeats as shown until successful validation of entered user authentication credentials. In this embodiment, validation occurs prior to loading local OS 206, so that user authentication process may be initiated and completed in an "instant on" manner without waiting for loading of a traditional local operating system. Further enhanced security is provided since local OS 206 is not loaded prior to validation of user authentication credentials in step 326.

Upon determination of the successful validation of user authentication credentials in step 326 and based on the particular credentials (e.g., user ID and password, smart card, biometric information, security token, etc. and combinations thereof, etc.) of the authenticated user, embedded service OS 202 of flexible computing node 200 determines available computing options for the given user, e.g., whether the flexible computing node is to load embedded application OS 204 (e.g., to perform tasks for the given user as a thin client) and/or to load and run local OS 206 and access host application/s locally running on local OS 206. In one embodiment, flexible computing node 200 then accordingly loads embedded application OS 204 and/or local OS 206 based on the determination made based on the particular authenticated user credentials.

If embedded application OS 204 is loaded (e.g., for thin client), methodology 300 then proceeds to step 328 where the flexible computing node considers device characteristics (e.g., type and processing characteristics of flexible computing node device platform 200), location characteristics (e.g., physical location of flexible computing node device platform 200), and/or network characteristics (e.g., bandwidth, latency, jitter, etc. of network 250) for a given user session. This information may be entered or provided in one exemplary embodiment by the user, or may be automatically determined by flexible computing node 200. In the illustrated embodiment of FIG. 3, embedded application OS 204 of flexible computing node 200 then presents this information across network 250 to a Service Broker (e.g., connection broker) running on a infrastructure server. In response, the Service Broker performs service authorization in step 330 based on the device characteristics, location characteristics and/or network characteristics information, and then flexible computing node 200 compiles and displays a list of available and/or prioritized service/connection options (e.g., terminal services session, KVMoIP session) in step 332. The authenticated user then selects available service/connection options in step 334, and in step 336 the flexible computing node 200 formulates a request based on the selected service/connection options and presents the service/connection request to service provider 224. In one exemplary embodiment, if a flexible computing node 200 is located outside the corporate wired network, embedded service OS 202 may force flexible computing node 200 to use embedded application OS 204 to connect to a terminal service, and not allow running of local OS 206. Thus, it is possible under some circumstances that a connection broker may enforce a connection type, and that the authenticated user may not be given any options from which to select.

The service provider 224 grants the requested service/s in step 338, and the user then consumes the requested service/s in step 340. Depending on the service/s that the user chooses to consume, the flexible computing node 200 may 1) start a new virtual machine (VM) from local system storage 135 or from a network server across network 250, or 2) start an application for remote access (e.g., RDP, ICA, KVMoIP client). It is also possible in one embodiment that the authenticated user may be allowed to maintain a session on embedded application OS 204 for access to a remote computer in a virtual desktop session (e.g., RDP, ICA, KVMoIP client), while at the same time maintaining a session on local operating system 206 (e.g., Windows session), and at the same time maintaining complete separation between a current session on local operating system 206 session and a current remote session on embedded application operating system 204 for situations where isolation is required or otherwise desired (e.g., for security reasons).

It will be understood that one or more steps of methodology 300 of FIG. 3 may be implemented by a computer program of instructions (e.g., computer readable code such as firmware code or software code) embodied in a tangible computer readable medium (e.g., optical disk, magnetic disk, non-volatile memory device, volatile memory device, etc.), in which the computer program comprising instructions are configured when executed (e.g., executed on a processing device such as a processor, microprocessor, microcontroller, controller, etc.) to perform the one or more steps of methodology 300.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed methods and systems may be utilized in various combinations and/or independently. Thus the invention is not limited to only those combinations shown herein, but rather may include other combinations.

What is claimed is:

1. A method of operating an information handling system, comprising:
   providing an information handling system configured as a flexible computing node, said flexible computing node being coupled to a network and comprising an embedded service operating system (OS), embedded application operating system (OS), a local operating system (OS), and one or more processing devices configured to execute said embedded service operating system (OS), embedded application operating system (OS), and local operating system (OS); and
   using said one or more processing devices to execute the following steps:
      booting said embedded service OS on said flexible computing node without booting said local OS or said embedded application OS,
      then receiving user authentication credentials or user identification information in said embedded service OS from a user,
      then presenting received user authentication credentials or user authentication credentials determined based on received user identification information from said embedded service OS across said network to an authentication server,
      then using said embedded service OS to determine whether to boot said embedded application OS or to boot said local OS only upon successful authentication of said presented user authentication credentials by said authentication server of said presented user authentication credentials, and
      then booting either said embedded application OS or said local OS based on said determination made by said embedded service OS.

2. The method of claim 1, further comprising using said one or more processing devices to perform the steps of: booting said embedded application OS based on said determination made by said embedded service OS; then determining at least one of device characteristics, location characteristics or network characteristics for the current user session; and then determining a list of available service/connection options based on at least one of device characteristics, location characteristics, network characteristics, or a combination thereof.

3. The method of claim 2, further comprising using said one or more processing devices to perform the steps of: presenting said determined list of available service/connection options to said user; then receiving a selection of available service/connection options from said user; then presenting a service/connection request to a service provider across said network, said service/connection request comprising said selection of available service/connection options made by said user; and then providing said requested service/connection from said service provider for consumption by said user across said network.

4. The method of claim 3, wherein said information handling system comprises local system storage; and wherein said method further comprising using said one or more processing devices to perform the steps of: providing said user with the capabilities of both starting a new local virtual machine from said local system storage and starting an application for remote access from a network server across said network.

5. The method of claim 3, wherein said information handling system comprises local system storage; and wherein said method further comprises using said one or more processing devices to perform the steps of: also booting said local OS based on said determination made by said embedded service OS; and providing a user with a first computing session on said embedded application OS that provides access across said network for said user to a remote computing device in a virtual desktop session while simultaneously providing said user with a separate and second computing session on said local OS.

6. The method of claim 1, further comprising using said one or more processing devices to perform the steps of: booting said embedded service OS on said flexible computing node in an instant-on manner upon powering on of said flexible computing node; and presenting a logon screen to receive said user authentication credentials or user identification information in said embedded service OS upon booting of said embedded service OS.

7. The method of claim 1, wherein said information handling system comprises hardware resources; wherein said flexible computing node further comprises a virtual machine monitor configured to run on said one or more processing devices at a level between said network and each of said embedded service operating system (OS), embedded application operating system (OS) and said local operating system (OS); and wherein each of said embedded service operating system (OS), embedded application operating system (OS) and said local operating system (OS) are configured to run on said one or more processing devices at a level between said user and said virtual machine monitor.

8. The method of claim 7, wherein said method further comprises using said one or more processing devices to perform the steps of: first validating said information handling system hardware prior to booting said embedded service OS on said flexible computing node; and only booting said embedded service OS and said virtual machine monitor on said flexible computing node if said hardware is successfully validated.

9. The method of claim 8, further comprising using said one or more processing devices to perform the steps of: validating said virtual machine monitor and said embedded service OS after successful validation of said information handling system hardware and prior to booting said embedded service OS and said virtual machine monitor on said flexible computing node; and only booting said embedded service OS and said virtual machine monitor on said flexible computing node if said embedded service OS and virtual machine monitor are each successfully validated on said flexible computing node.

10. An information handling system configured as flexible computing node, comprising:
   one or more processing devices;
   an embedded service operating system (OS);
   an embedded application operating system (OS); and
   a local operating system (OS);
   wherein said flexible computing node is configured to be coupled to a network; and wherein said flexible computing node is configured to use said one or more processing devices to:
- boot said embedded service OS on said flexible computing node without booting said local OS or said embedded application OS,
- then receive user authentication credentials or user identification information in said embedded service OS from a user,
- then present received user authentication credentials or user authentication credentials determined based on received user identification information from said embedded service OS across said network to an authentication server,
- then use said embedded service OS to determine whether to boot said embedded application OS or to boot said local OS only upon successful authentication of said presented user authentication credentials by said authentication server of said presented user authentication credentials, and
- then boot either said embedded application OS or said local OS based on said determination made by said embedded service OS.

11. The information handling system of claim 10, wherein said flexible computing node is furthered configured to use said one or more processing devices to: boot said embedded application OS based on said determination made by said embedded service OS; then determine at least one of device characteristics, location characteristics or network characteristics for the current user session; and then determine a list of available service/connection options based on at least one of device characteristics, location characteristics, network characteristics, or a combination thereof.

12. The information handling system of claim 11, wherein said flexible computing node is furthered configured to use said one or more processing devices to: present said determined list of available service/connection options to said user; then receive a selection of available service/connection options from said user; then present a service/connection request to a service provider across said network, said service/connection request comprising said selection of available service/connection options made by said user; and then provide said requested service/connection from said service provider for consumption by said user across said network.

13. The information handling system of claim 12, wherein said information handling system comprises local system storage; and wherein said wherein said flexible computing node is furthered configured to use said one or more processing devices to: provide said user with the capabilities of both starting a new local virtual machine from said local system storage and to start an application for remote access from a network server across said network.

14. The information handling system of claim 12, wherein said information handling system comprises local system storage; and wherein said flexible computing node is furthered configured to use said one or more processing devices to: also boot said local OS based on said determination made by said embedded service OS, and to provide a user with a first computing session on said embedded application OS that provides access across said network for said user to a remote computing device in a virtual desktop session while simultaneously providing said user with a separate and second computing session on said local OS.

15. The information handling system of claim 10, wherein said flexible computing node is furthered configured to use said one or more processing devices to: boot said embedded service OS on said flexible computing node in an instant-on manner upon powering on of said flexible computing node; and to present a logon screen to receive said user authentication credentials or said user identification information in said embedded service OS upon booting of said embedded service OS.

16. The information handling system of claim 10, wherein said information handling system comprises hardware resources; wherein said flexible computing node further comprises a virtual machine monitor configured to run on one or more of said processing devices at a level between said network and each of said embedded service operating system (OS), embedded application operating system (OS) and said local operating system (OS); and wherein each of said embedded service operating system (OS), embedded application operating system (OS) and said local operating system (OS) are configured to run on one or more of said processing devices at a level between said user and said virtual machine monitor.

17. The information handling system of claim 16, wherein said information handling system comprises an embedded controller (EC); and firmware provided to execute on said EC that is configured to: validate said information handling system hardware prior to booting said embedded service OS on said flexible computing node; and to only boot said embedded service OS and said virtual machine monitor on said flexible computing node if said hardware is successfully validated.

18. The information handling system of claim 17, wherein said information handling system further comprises firmware provided to execute on said EC that is configured to: validate said virtual machine monitor and said embedded service OS after successful validation of said information handling system hardware and prior to booting said embedded service OS and said virtual machine monitor on said flexible computing node; and to only boot said embedded service OS and said virtual machine monitor on said flexible computing node if said embedded service OS and virtual machine monitor are each successfully validated on said flexible computing node.

19. The information handling system of claim 10, wherein said information handling system further comprises local system storage, a central processing unit (CPU), and an embedded controller (EC); wherein each of said embedded service OS and said embedded application OS are configured as firmware that execute on said EC; and wherein said local OS is configured as software on said local system storage that executes on said CPU.

20. A method of operating an information handling system, comprising:
- providing an information handling system configured as a flexible computing node, said flexible computing node being coupled to a network and comprising a flexible computing client, an embedded application operating system (OS), a local operating system (OS), and further comprising one or more processing devices; and
- using said one or more processing devices to execute the following steps with the flexible client without booting said local OS or said embedded application OS:
  - accepting user authorization credentials or user identification information in said flexible computing client from a user,
  - then presenting accepted user authorization credentials or accepted user authentication credentials determined based on accepted user identification information from said flexible computing client across said network to an authentication server,
  - then determining whether to boot said embedded application OS or to boot said local OS only upon successful authentication of said presented user authentication credentials by said authentication server of said presented user authentication credentials; and then using said one or more processing devices to boot either said embedded application OS or said local OS based on said determination.

21. The method of claim 20, further comprising using said one or more processing devices to perform the steps of:

compiling a list of one or more authorized computing resources for said user in said flexible computing client based at least in part on said user authorization credentials, and presenting said list of said one or more authorized computing resources for said user upon successful user authentication by said authentication server, and using said flexible computing client to at least one of connect to said authorized computing resources for said user, present choices of two or more authorized computing resources to said user for connection to said authorized computing resources, or a combination thereof.

22. The method of claim 20, further comprising using said one or more processing devices to perform the steps of: compiling a list of network connection options from said flexible computing client to said user based on at least one of device characteristics, location characteristics or network characteristics for the current user session; and then allowing said user to select at least one of said network connection options.

23. An information handling system configured as a flexible computing node configured for coupling to a network, said information handling system comprising:

a flexible computing client;

a local operating system (OS);

an embedded application operating system (OS); and one or more processing devices, said one or more processing devices being configured to execute said flexible computing client to execute the following steps with the flexible client without booting said local OS or said embedded application OS:

accept user authorization credentials or user identification information from a user and present accepted user authorization credentials or user authentication credentials determined based on accepted user identification information across said network to an authentication server, then determining whether to boot said embedded application OS or to boot said local OS only upon successful authentication of said presented user authentication credentials by said authentication server of said presented user authentication credentials; and where the one or more processing devices are configured to then boot either said embedded application OS or said local OS based on said determination.

24. The information handling system of claim 23, wherein said one or more processing devices are further configured to execute said flexible computing client to:

compile and present a list of one or more authorized computing resources to said user upon successful user authentication, said list of one or more authorized computing resources being based at least in part on said user authorization credentials of said user; and at least one of connect to said authorized computing resources for said user, present choices of two or more authorized computing resources to said user for connection to said authorized computing resources, or a combination thereof.

25. The information handling system of claim 23, wherein said one or more processing devices are further configured to execute said flexible computing client to:

compile a list of network connection options for said user based on at least one of device characteristics, location characteristics or network characteristics for the current user session;

then present said list of network connection options to said user; and then allow said user to select at least one of said network connection options.

* * * * *